Dec. 31, 1968  J. L. SNARR  3,418,913
FILM PROCESSOR
Original Filed July 23, 1963  Sheet 2 of 7
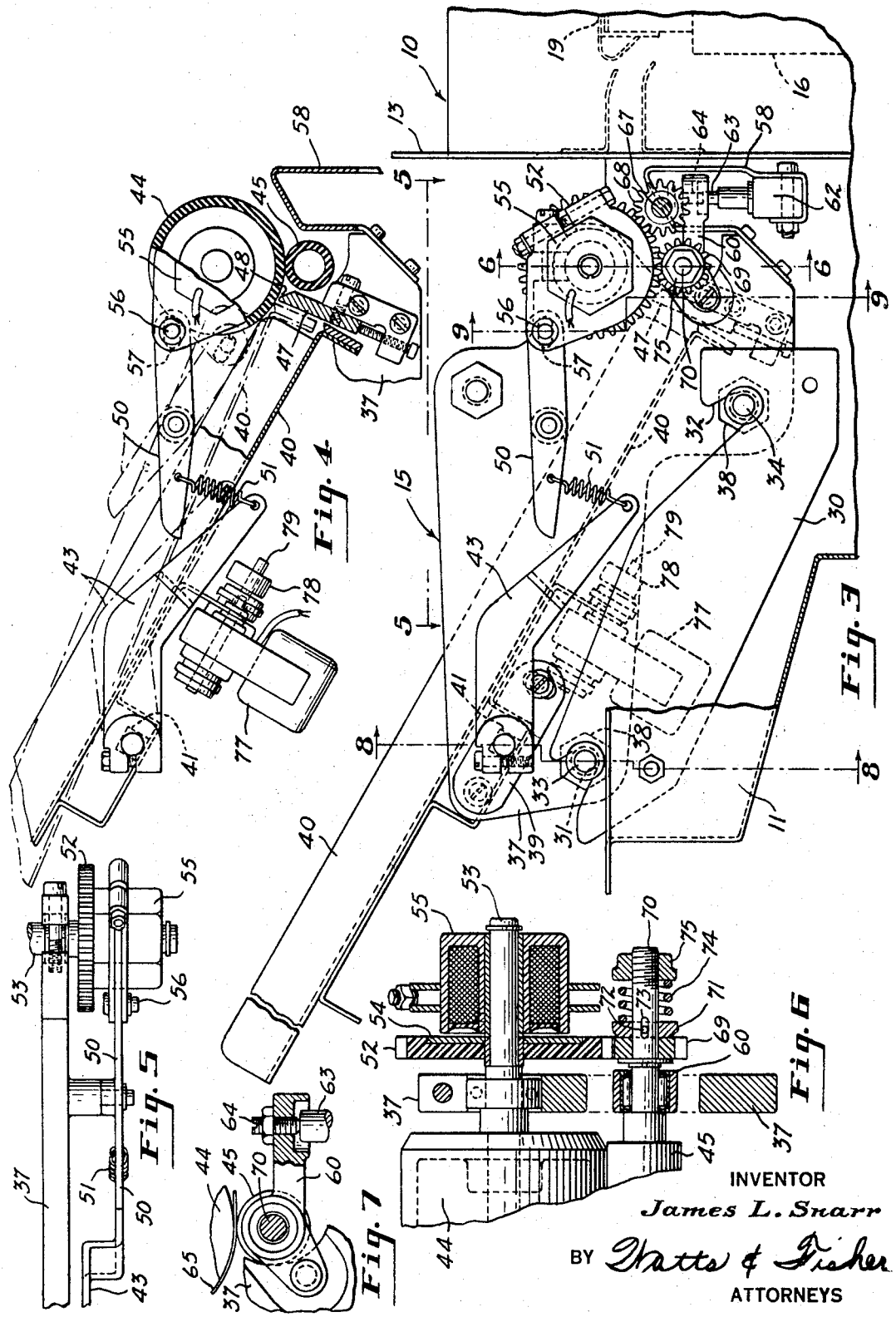
INVENTOR
James L. Snarr
BY *Watts & Fisher*
ATTORNEYS

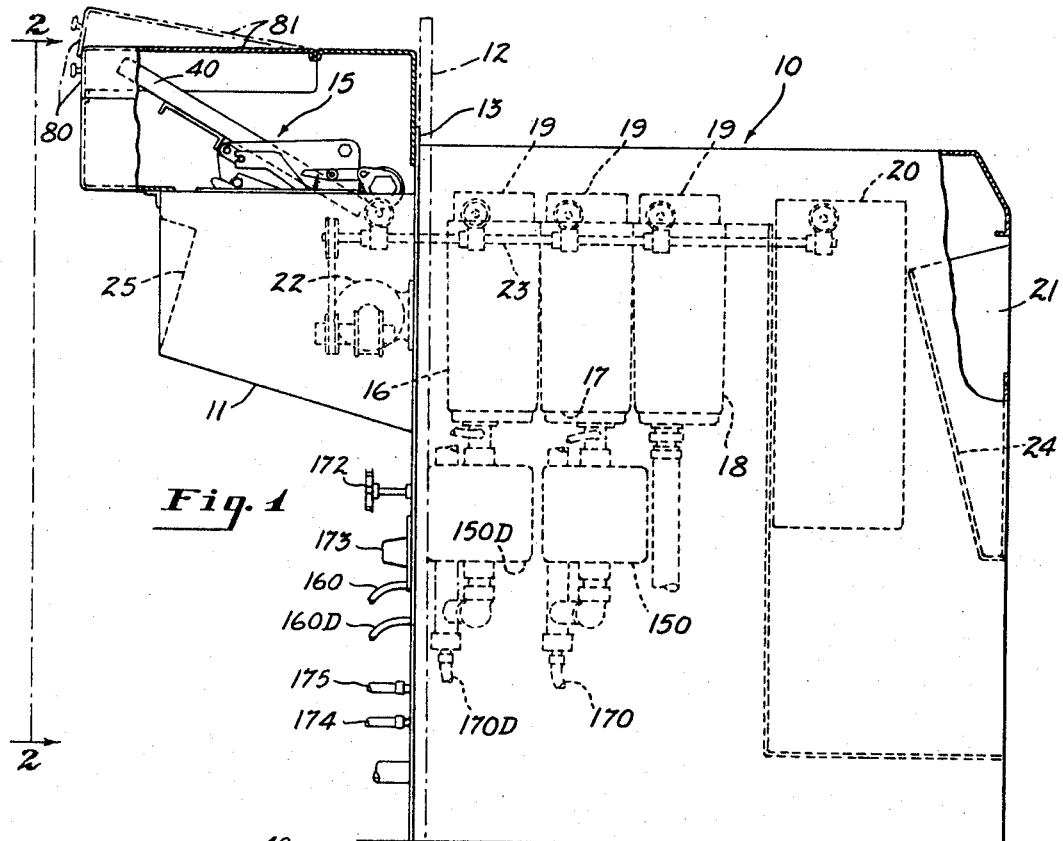
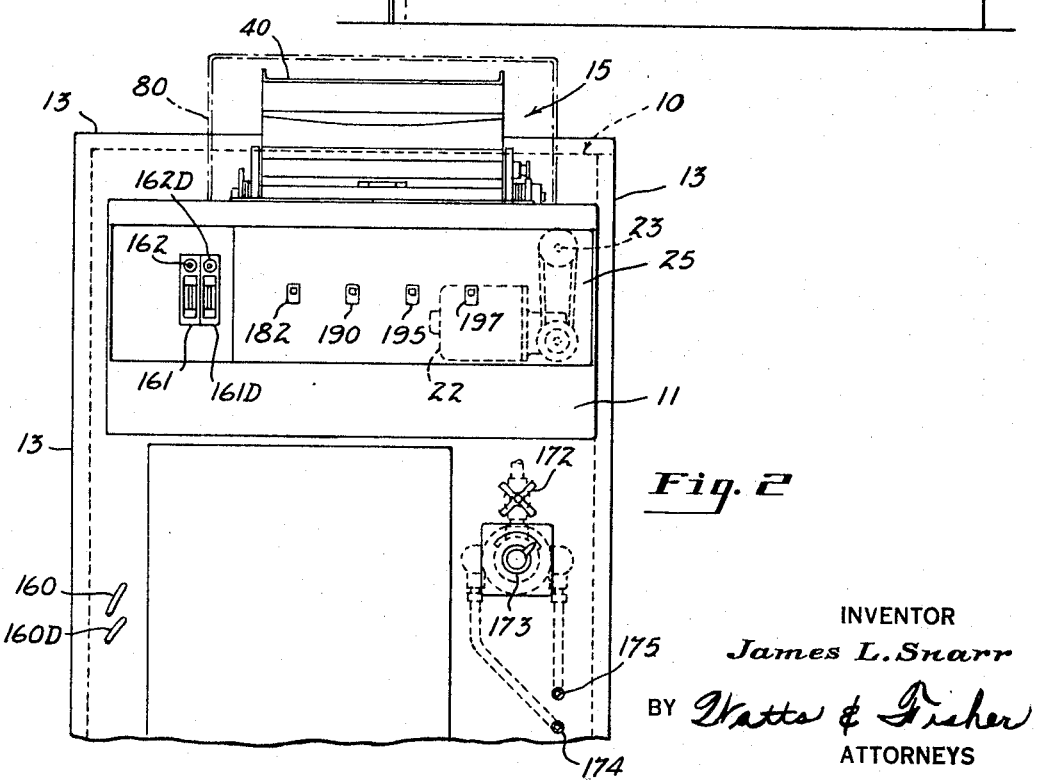

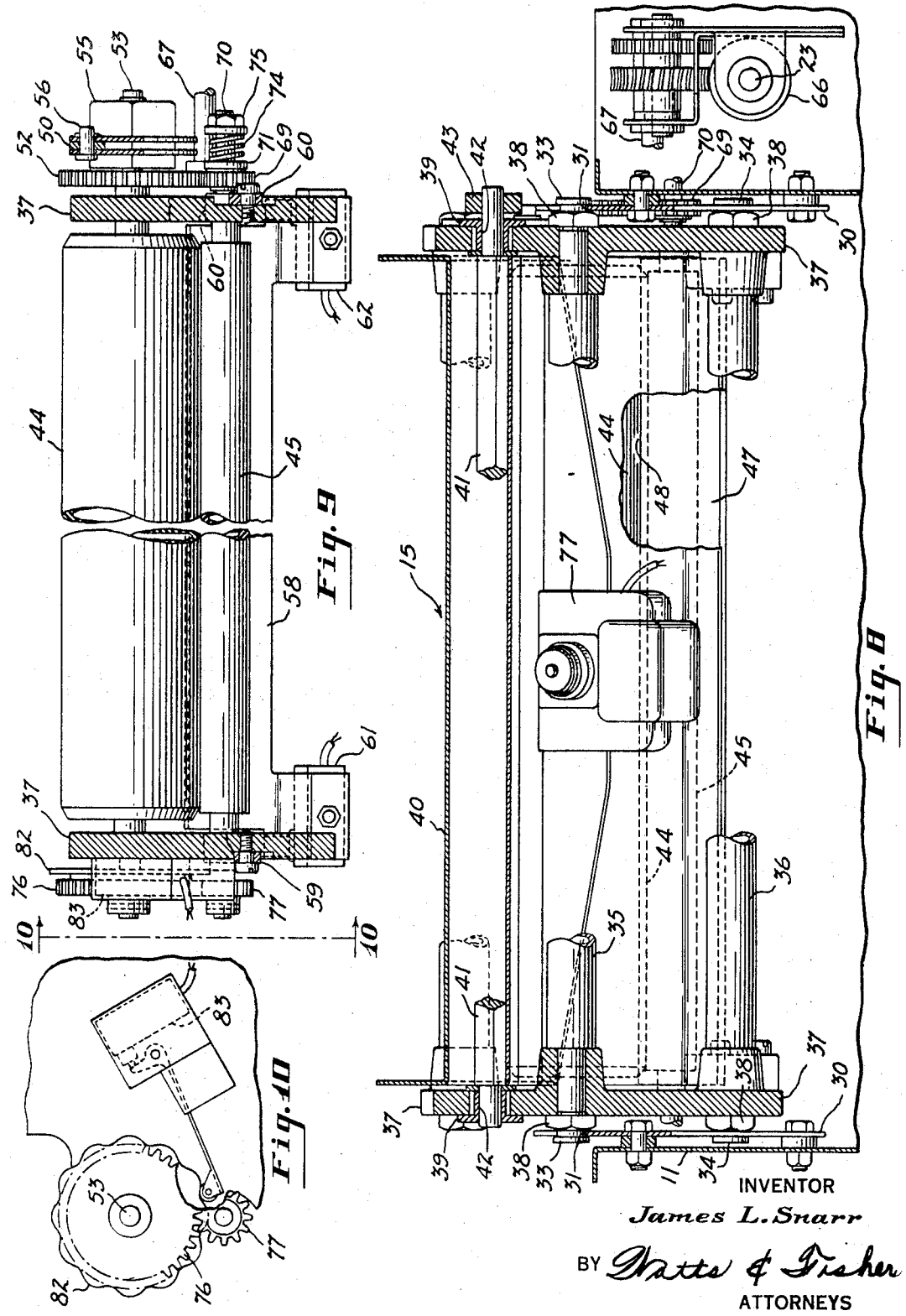

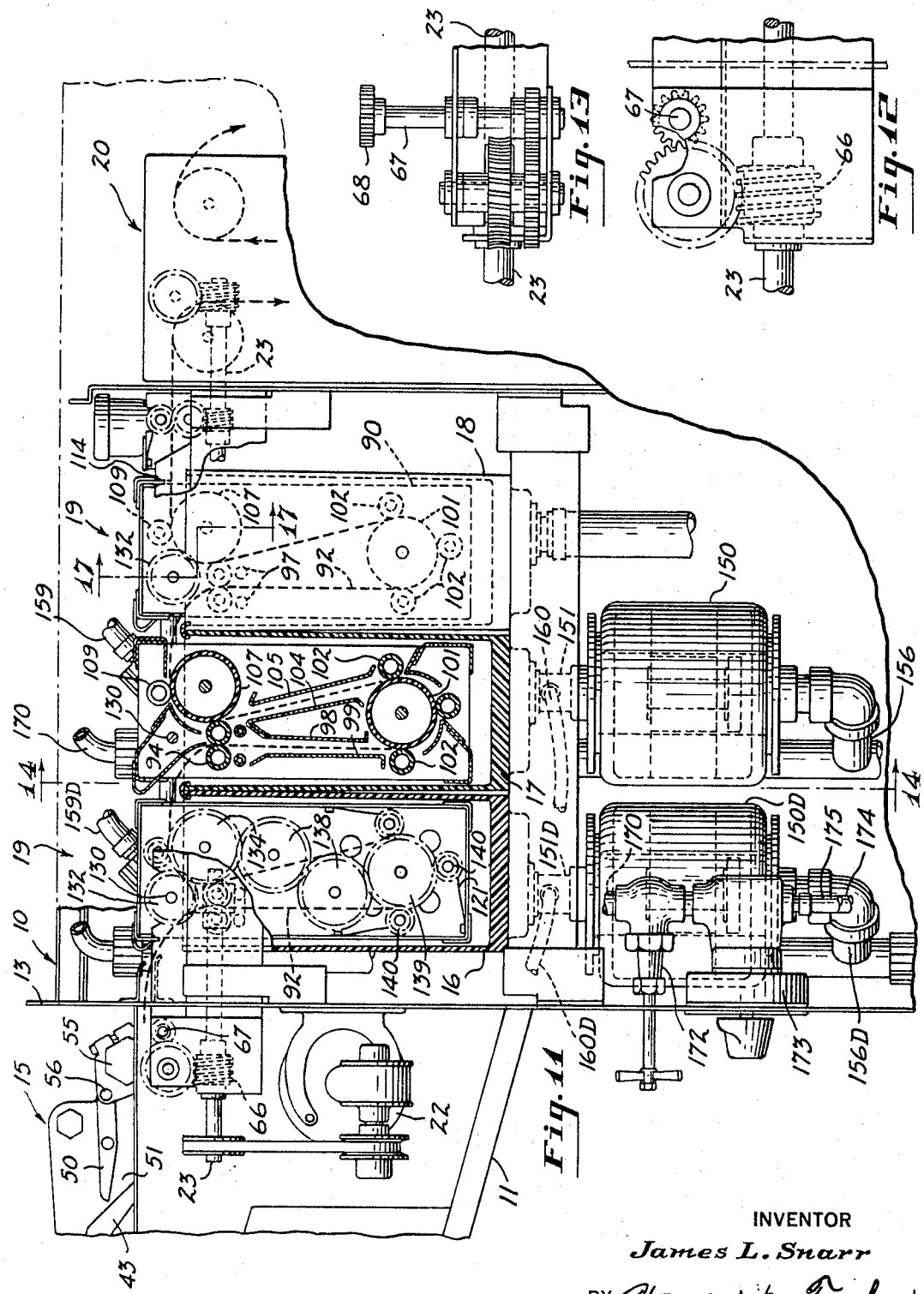

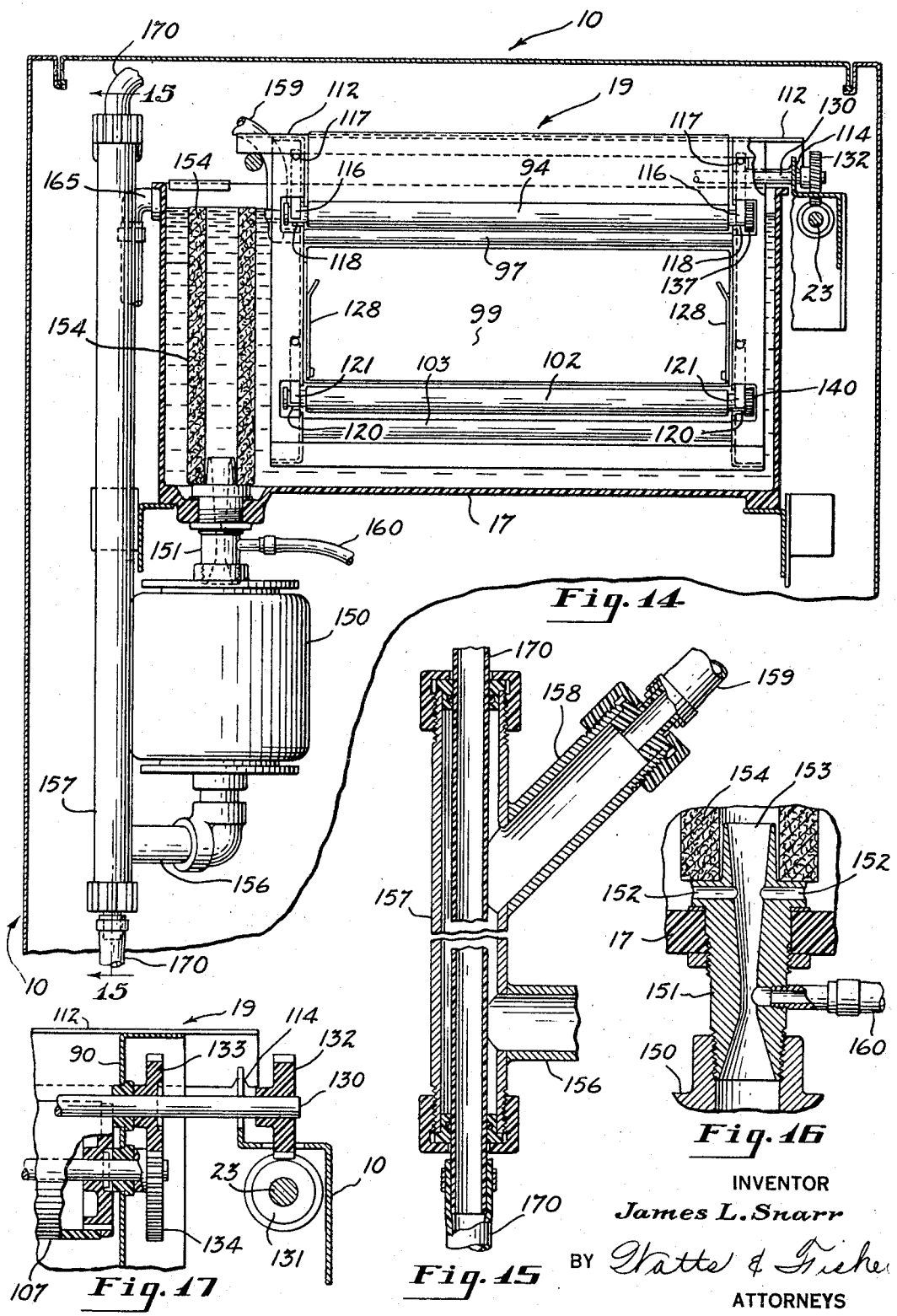

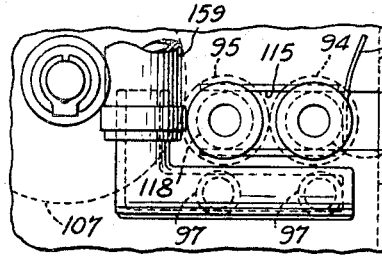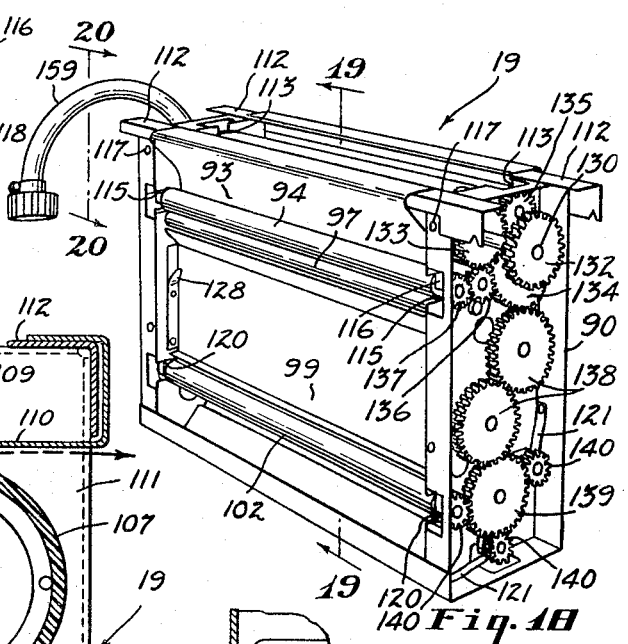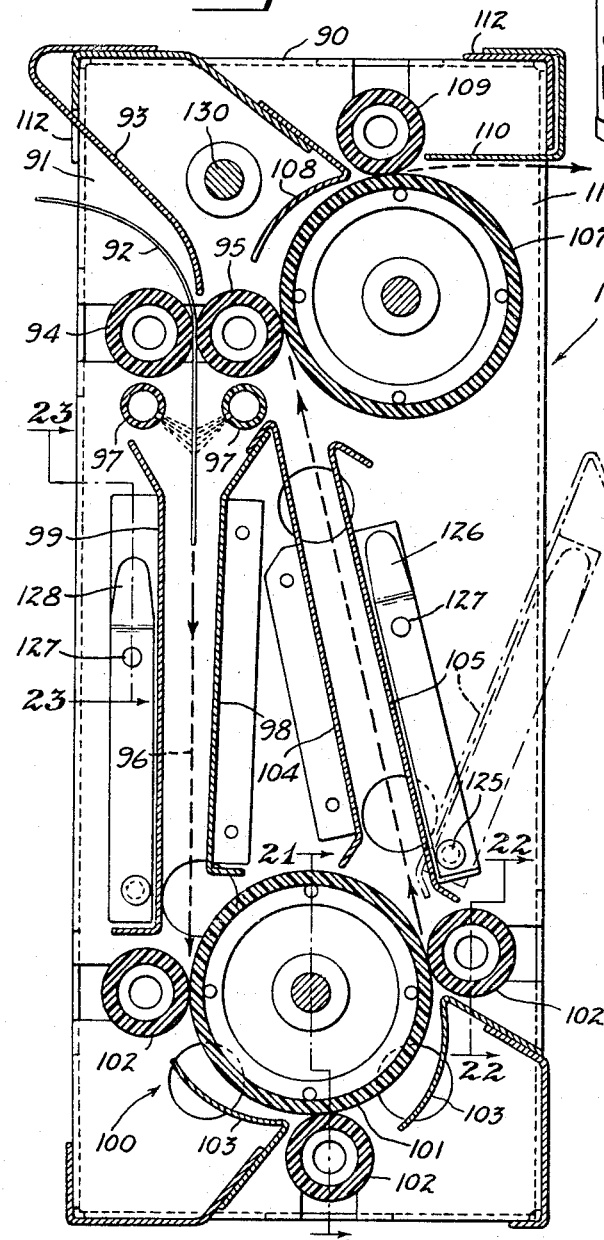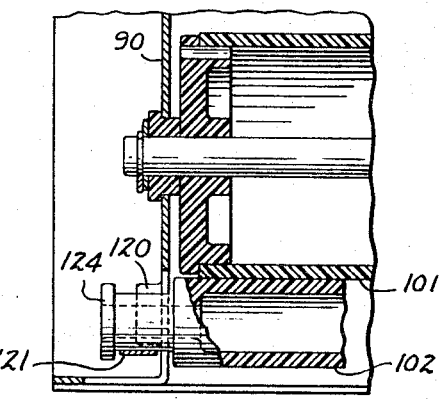

INVENTOR
James L. Snarr
BY Watts & Fisher
ATTORNEYS

3,418,913
FILM PROCESSOR
James L. Snarr, Cleveland Heights, Ohio, assignor, by mesne assignments, to Picker Corporation, White Plains, N.Y., a corporation of New York
Continuation of application Ser. No. 296,999, July 23, 1963. This application Feb. 10, 1967, Ser. No. 615,260
41 Claims. (Cl. 95—94)

ABSTRACT OF THE DISCLOSURE

Film processor including an automatic feed for feeding sheets of film one at a time from a stack of cut film of admixed sizes. The feeder includes a tray that is elevated until the top film on a stack of sheets of film supported on the tray is stripped from the stack. The processor senses a sheet of film being fed to control the feeder and thereby control the spacing of the sheets of film uniformly and also to control a supply of replenishment fluid.

*Cross reference to related applications*

This application is a continuation of copending application Ser. No. 296,999, filed July 23, 1963, which is entitled, "Film Processor."

This invention pertains to film processors and more particularly to a novel and improved film processor for the development of exposed sheets of film such as X-ray film.

In the past there have been a number of proposals for mechanisms for processing sheets of X-ray film. These previous proposals have had certain inherent drawbacks which are overcome by the present invention. Principal among these has been that prior proposals have relied upon manual insertion of the sheets to be processed into the processing mechanism. The present invention provides an automatic film processor in which a feeding assembly supplies sheets of exposed film automatically and sequentially, one at a time, to the processing mechanism. The films are fed in rapid succession so that each sheet of film follows the preceding sheet of film in close, predetermined, spaced relationship.

In the feed assembly of the present processor a pair of feed rolls are provided. An elevator supports a stack of sheets of film and automatically and repetitively brings the top sheet of the stack into engagement with one of the feed rolls, whenever it is desired to feed a sheet of film through the processor. The friction of the top roll draws the top sheet of film off the stack and feeds it between the two feed rolls.

A film sensing means, preferably in the form of limit switches, is provided on the side of the feed rolls opposite the elevator so that as soon as the stripped sheet of film passes between the feed rolls, the elevator is de-energized and maintained in a de-energized condition until the stripped sheet of film has passed completely through the feed rolls. As soon as the stripped sheet of film has passed the limit switches, they re-energize the elevator to bring the stack upwardly until the sheet of film now on the top of the stack is stripped from the stack. This described mechanism both automatically feeds the film sheets one at a time and also provides an automatic time delay between sheets so as to provide uniform spacing.

A timer is provided so that when the elevator is elevated after the least sheet of film has passed through the rolls the elevator is automatically de-energized after a predetermined period of time and visual and/or audible warnings are provided to the operator to apprise him of the fact that the feeding has terminated.

A specialized feature of the feed assembly is the provision of a means to vibrate the elevator to enhance and expedite sheet feeding. This vibration is obtained through a simple and novel use of a fractional horsepower electric motor which drives an eccentric weight.

Another feature of the present automatic feed assembly is that it senses the abnormalities in the film feed apt to damage the film. If, for some reason, the mechanism attempts to feed two sheets of film simultaneously or a sheet becomes badly cocked, the feed assembly ceases to function and a signal advises the operator that the feed has stopped.

An additional feature of the present device is that the entire processing of the exposed film is done within a closed housing and the finished and dried sheets of film are delivered through a discharge opening at the outlet end of a dryer. The feed assembly is disposed in a housing extension at the end opposite the dryer outlet and the unit is so designed that the feed assembly may be positioned within a dark room while the remainder of the unit including the discharge outlet is positioned externally of the dark room. With this construction, the operator need only enter the dark room at intervals when a signal advised him that the elevator is empty and then only for the purpose of loading the elevator. The feed assembly is encased within a light tight housing so that the dark room need be dark only at the time when the elevator is actually being loaded.

A further feature of the feed assembly is that the entire assembly may be lifted off the remainder of the processing machine for cleaning, maintenance, or repair without disconnecting any bolts or the like. Appropriate pin and notch construction is provided so that the assembly is located in the proper position when mounted on the machine and maintained there simply by gravity.

The improved and speeded film processing is obtained through a novel system for supplying processing fluid to the film. Horizontally disposed spray bars are employed which direct processing liquid against both faces of a sheet of film as it commences its travel through a film transfer mechanism. These spray bars are fed directly by a pump. Replenishment fluid is fed by a venturi into the system whenever a film is passing through the feed rolls. Thus, as a film passes through the feed rolls fresh replenishment fluid is automatically fed into both the developing and fixing solutions as it is needed and this fresh solution is transported directly to the spray bars where it is applied to the surface of the film. Moreover, the bars are positioned below the fluid level with orifices that issue jets of processing fluid. These jets are arranged to enhance the processing both by obliquely striking the surfaces of a sheet being processed and by agitating the processing fluid.

The improved system of fluid replenishment also permits the use of visual flow meters in order that an operator can determine whether or not replenishment fluid is actually being fed into the systems. Moreover, this system utilizes a single pump and a venturi for each of the developing and fixing tanks as compared with the prior practice which has required two pumps, one for circulation and a second for supplying replenishment fluid.

A specialized feature of the invention resides in the fluid supply system for the venturis. The developer and fixing tanks are each equipped with an elongated tubular, upstanding filter which circumscribes the main venturi inlet. By-pass inlets are provided to insure adequate venturi supply and prevent back pressure.

A further feature of the invention resides in a novel and improved fluid distribution system through which water being supplied to the wash tank is used to cool the developing and fixing solutions.

An important feature of the invention resides in the novel and improved electrical circuitry incorporated in this structure which provides the features discussed above and other features which will become apparent from the reading of the following description.

Accordingly, the object of this invention is to provide a novel and improved film processor and a method of operating the processor.

Other objects and a fuller understanding of the invention may be had by referring to the following description and claims taken in conjunction with the accompanying drawings in which:

In the drawings:

FIGURE 1 is a side elevational view of the novel and improved photographic film processor;

FIGURE 2 is a foreshortened end elevational view of the processor as seen from the plane indicated by the line 2—2 of FIGURE 1;

FIGURE 3 is a fragmentary side elevational view of the film feed mechanism and elevator assembly, on an enlarged scale with respect to FIGURE 1;

FIGURE 4 is a foreshortened view with parts broken away and removed and corresponding to FIGURE 3, showing the elevator in solid lines in a descended position and in phantom in an elevated position;

FIGURE 5 is a fragmentary top plan view of portions of the film feed assembly as seen from the plane indicated by the line 5—5 of FIGURE 3;

FIGURE 6 is a fragmentary sectional view of portions of the film feed assembly as seen from the plane indicated by the lines 6—6 of FIGURE 3 and on an enlarged scale with respect to FIGURE 3;

FIGURE 7 is a fragmentary sectional view of the feed roll and the limit switch tension adjusting mechanism on the scale of FIGURE 6;

Figure 24:
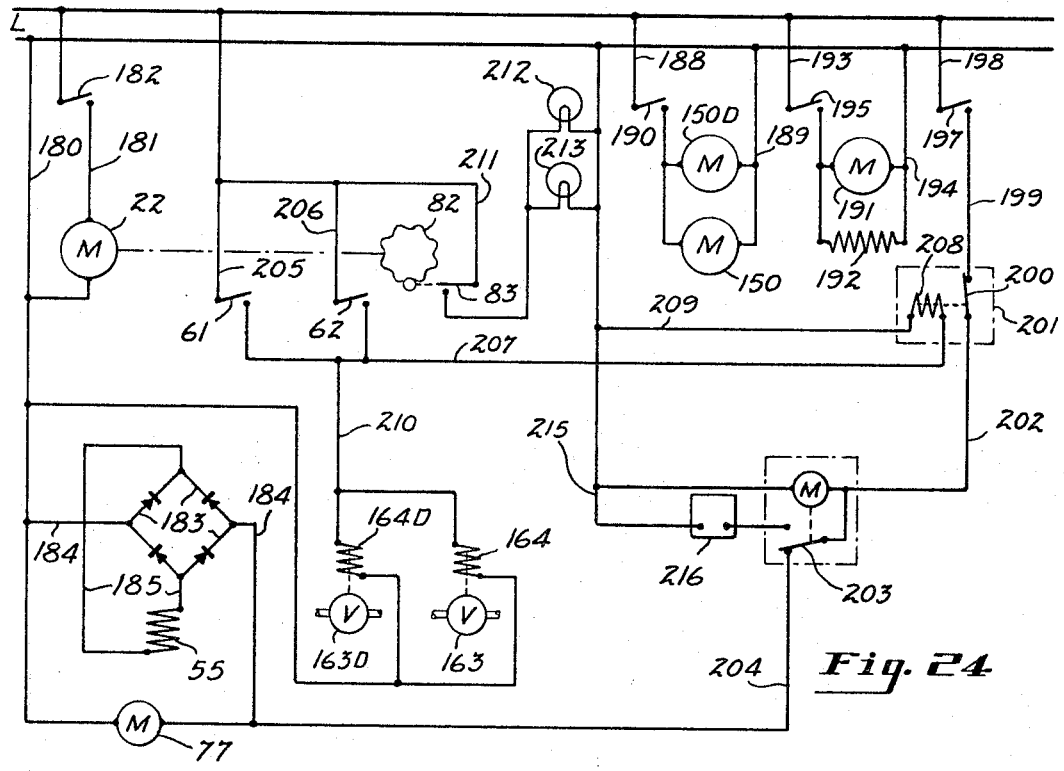
Figure 25:
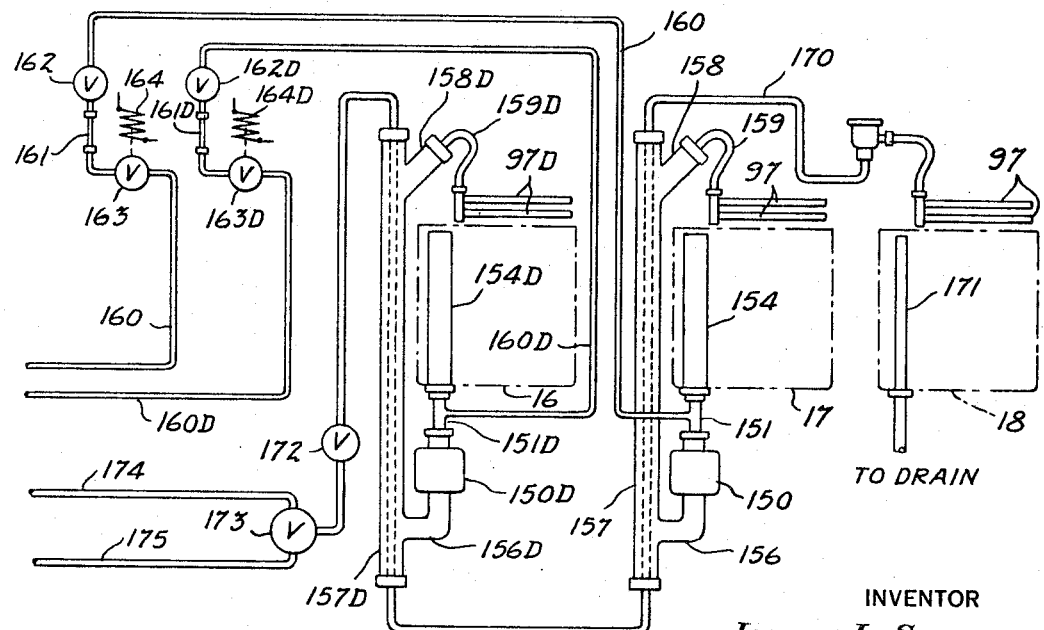

FIGURES 8 and 9 are sectional views of the film feed assembly as seen from the planes indicated by the lines 8—8 and 9—9 respectively of FIGURE 3;

FIGURE 10 is a fragmentary end elevational view of portions of the feed assembly as seen from the plane indicated by the line 10—10 of FIGURE 9 and showing a mechanism designed to actuate a flasher light to indicate when the film feed rolls are operating;

FIGURE 11 is an enlarged fragmentary side elevational view of the processor with parts broken away and removed;

FIGURE 12 is an enlarged side elevational view of portions of the drive gearing;

FIGURE 13 is a top plan view of the gearing in FIGURE 12;

FIGURE 14 is a fragmentary sectional view of the device as seen from the plane indicated by the line 14—14 of FIGURE 11;

FIGURE 15 is a foreshortened sectional view as seen from the plane indicated by the line 15—15 of FIGURE 14 showing portions of the conduit system for providing recirculation of the processing fluids and replenishment of them;

FIGURE 16 is an enlarged sectional view of the venturi apparatus used to introduce replenishment fluids and showing portions of the filter and a bypass arrangement;

FIGURE 17 is a fragmentary sectional view of portions of the drive system as seen from the planes indicated by the lines 17—17 of FIGURE 11;

FIGURE 18 is a perspective view of a film transfer mechanism;

FIGURE 19 is an enlarged sectional view of the film transfer mechanism as seen from the plane indicated by the line 19—19 of FIGURE 18;

FIGURE 20 is a fragmentary end elevational view as seen from the plane indicated by the line 20—20 of FIGURE 18;

FIGURE 21 is a fragmentary sectional view as seen from the plane indicated by the lines 21—21 of FIGURE 19;

FIGURE 22 is an enlarged fragmentary view showing a feed roll retaining mechanism as seen from the planes indicated by the lines 22—22 of FIGURE 19;

FIGURE 23 is a fragmentary sectional view of the removable lock mechanism for a side of the film chute;

FIGURE 24 is a circuit diagram; and,

FIGURE 25 is a schematic diagram showing the fluid circulation system.

Referring now to the drawings and FIGURE 1 in particular, a film processor housing is shown generally at 10. The housing 10 includes a laterally projecting feed assembly support section 11 which extends laterally to the left as viewed in FIGURE 1. In the preferred installation, the processor will be positioned with the main portion of the housing 10 outside of a darkroom and a feed section 11 positioned within the darkroom. In FIGURE 1 an apertured darkroom wall is depicted in phantom at 12. A laterally projecting flange 13 will circumscribe the edges of an aperture in the wall 12 forming a light tight seal.

A film feed assembly 15 is removably supported on the feed extension 11 of the housing 10. The feed assembly supplies sheets of film to developing, fixing, and wash tanks 16, 17, 18, which are positioned side by side within the main portion of the housing 10 and to the right of the feed assembly 15 as viewed in FIGURE 1. Identical and removable film transfer mechanisms 19 are positioned in the tanks 16, 17, 18, for transporting the sheets of film supplied by the feeder sequentially through the tanks 16, 17, 18. An automatic dryer 20 is within the main portion of the housing 10 and positioned adjacent an outlet opening 21. The dryer receives sheets from the wash tank 18, dries them, and discharges them into a collecting bin 24 adjacent the outlet opening 21.

A drive motor 22 is positioned within the feed extension 11 of the housing. The drive motor 22 is connected to a drive shaft 23 which extends longitudinally through the housing 10. The shaft 23 is in driving connection with the feed assembly 15, the film transfer mechanisms 19, and the dryer 20. The single drive motor 22 is used to operate all film transporting mechanism and the dryer.

As will become apparent from the subsequent detailed description of the mechanisms, it is desirable to have the controls of the processor accessible from within the darkroom. Accordingly, the feed section of the housing 11 is equipped with a recessed control panel 25. The recessed control panel 25 is at the left hand end of the extension 11 as viewed in FIGURE 1 and is seen most plainly in FIGURE 2.

For convenience the balance of this specification will be divided into separately identified sections as follows:

(I) The film feed assembly 15.
(II) The film transfer mechanisms 19.
(III) The tanks 16, 17, 18 and liquid distribution system.
(IV) The electrical controls and summary.

(I) THE FILM FEED ASSEMBLY 15

A pair of assembly support plates 30, FIGURES 3 and 8, are bolted to the sides of the assembly extension 11. The assembly support plates 30 are notched at 31 and 32 and respectively removably receive feed assembly support pins 33, 34. The entire feed assembly is removable by simply lifting it and simultaneously moving it to the left as viewed in FIGURE 1 to disengage the pins 33, 34 from the notches 31, 32. This liftout assembly is provided:

(1) To expedite repair and/or cleaning of the feed assembly as well as repair of portions of the mechanism encased within the housing feed assembly section 11; and, (2) To permit ready conversion of the unit to a manual feed unit should that be desired.

The supporting pins 33, 34 are the opposite ends of frame cross bars 35, 36 respectively of a feed assembly frame, FIGURE 8. Sides of the feed assembly frame are provided by spaced side plates 37 which are secured to the cross bars 35, 36 as by nuts 38.

An elevator tray 40 is secured to a square elevator shaft 41. The elevator shaft is journaled in spaced bearings 42 which are carried by adjustable supports 39. The supports 39 are mounted on the frame side plates 37. A tray elevating link 43 is secured to the end of the elevator shaft 41 which is the right hand end as seen in FIGURE 8. The elevator link 43 is positioned outwardly of the right hand side plate 37. The tray 40 slopes downwardly to the right as seen in FIGURES 3 and 4 terminating at a discharge end adjacent upper and lower feed rolls 44, 45.

The upper feed roll 44 is a soft roll which is journaled at the right hand end, as viewed in FIGURES 1, 3 and 4, of the frame side plates 37. The lower feed roll is a hard roll whose mounting will be described below. A vertically adjustable stop and stripper plate 47 is mounted on the feed assembly frame adjacent the discharge end of the elevator tray 40. The stop and stripper plate 47 is vertically adjustable so that a space 48 between the upper feed roll 44 and the stripper plate 47 may be precisely adjusted to permit the passage of one, but only one, sheet of film at a time between the upper feed roll 44 and the stop and stripper plate 47.

During normal operation the feed rolls 44, 45 are constantly rotating through a drive system which will be explained below. A stack of sheets of film to be fed between the feed rolls 44, 45 is positioned on the tray 40 with the lead edge of each sheet of film abutting the stop and stripper plate 47. The tray is elevated by a mechanism which will be described, until the top sheet of the stack abuts the upper feed roll 44. The feed roll 44 frictionally engages the top sheet and through its rotation which is counterclockwise as viewed in FIGURE 4, causes the top sheet to commence to travel with it. The stop and stripper plate 47 prevents movement of the remainder of the sheets of film in the stack and, accordingly, the top sheet is stripped from the stack and passed through the space 48 between the stop and stripper plate 47 and the upper feed roll 44. The sheet then passes between the feed rolls 44, 45. The upper feed roll 44 is of considerably larger diameter than the lower roll 45 to facilitate the stripping.

A pivoted elevating link 50 is pivotally mounted on the frame for movement from the position shown in solid lines in FIGURE 4 to the position shown in phantom. The pivoted link 50 is yieldably connected to the tray elevating link 43 by a spring 51. When the pivoted link 50 is moved to the position shown in phantom in FIGURE 4, the spring 51 is tensioned to elevate the tray elevating link 43. This elevates the discharge end of the connected tray 40 to move the stack of sheets of film upwardly until the top sheet abuts the top feed roll 44.

A feed roll idler gear 52 is journaled on a top feed roll shaft 53. The idler gear 52 is to the right of the top roll 44 as viewed in FIGURES 6 and 9. A magnetically susceptible striker plate 54 is secured to and rotates with the idler gear 52. An electric magnet 55 is journaled on the feed roll shaft 53 in a manner which permits the shaft 53 to rotate freely within the magnet. When the magnet 55 is energized it will rotate with the idler gear 52 because of the attraction of the magnet to the striker plate 54.

An eccentric pin 56 is fixed to the magnet, FIGURES 3 and 4. The eccentric pin 56 is slidably disposed in a slot 57 in the pivot link 50. When the magnet 55 is energized, it rotates with the idler gear 52 causing the pivot link 50 to move from its solid to its phantom line position as seen in FIGURE 4 elevating the discharge end of the tray. Once the rotation of the magnet 55 has caused the tray 40 to elevate until the top one of a stack of sheets of film on the tray abuts the top feed roll, the magnet will operate as a slip clutch, slipping relative to the striker plate 54 until de-energized.

The lower feed roll 45 is mounted on a pair of pivot arms 59, 60, FIGURES 7 and 9. A pair of limit switches 61, 62 are secured to a feed assembly frame film guide cross member 58, FIGURES 3 and 9, which serves the dual function of film deflector and frame member. The limit switches 61, 62 are positioned below the arms 59, 60 FIGURE 9. The switches 61, 62 include upwardly directed spring biased plungers, 63, only one of which is visible in FIGURES 3 and 7. Adjustment screws 64, one of which is visible in FIGURE 7, are threaded into the support arms 59, 60. As seen in FIGURE 7 the adjustment screw is threaded into the lower roll support arm 60 to maintain the proper tension between the plunger 63 and the arm 60. When a sheet of film 65, FIGURE 7, passes between the feed rolls 44, 45, the lower feed roll will be depressed enough to actuate one or both of the limit switches 61, 62 de-energizing the magnet 55 and allowing the tray to drop.

After the strip of film 65 has passed between the rolls, the biasing plunger 63 will elevate the lower roll 45 allowing the limit switches to energize the magnet again in a manner which is described in greater detail in the electrical section. When the limit switches are again closed, the magnet 55 is re-energized so that the tray 40 is elevated for the feeding of the next sheet of film. The time delay occasioned in energizing the magnet 55 only after a sheet of film has passed between the feed rolls is designed to provide a desired amount of spacing of approximately 2 inches between successive sheets of film. Experience has shown that a spacing of about 2 inches is proper to allow for transport of the film through the processor without danger of successive sheets of film becoming partially overlapped.

A worm 66 is secured to the through shaft 23, FIGURES 8, 12 and 13. Through suitable gearing shown in FIGURES 12 and 13, the worm 66 drives a feed assembly drive shaft 67. A feed assembly drive pinion 68 is fixed to the inner end of the feed roll drive shaft 67, the upper end as viewed in FIGURE 13. The feed assembly pinion 68 meshes with the idler 52, FIGURE 3. A feed roll drive gear 69 engages the idler gear 52, FIGURES 3, 6 and 9.

The unique construction which prevents the simultaneous feeding of two sheets of film between the feed rolls 44, 45, is best understood by reference to FIGURE 6. The feed roll drive gear 69 is journaled on a lower feed roll shaft 70 for free relative rotation. A drive ring 71 is mounted on the lower feed roll drive shaft 70 and secured against relative rotation by a pin 72 which projects through a longitudinally extending slot 73 in the lower feed roll drive shaft 70. The pin 72 and the connected drive ring 71 are free to move axially relative to the lower feed roll shaft 70. The drive ring 71 is biased against the feed roll drive gear 69 by a spring 74 under compression. The compression is adjusted by a nut 75 threaded on the lower feed roll drive shaft 70.

The drive ring 71 and the lower feed roll drive gear 69 coact to provide a slippable clutch so that when two sheets of film commence to simultaneously pass between the feed roll 44, and the stripper plate 47, slipping will occur and feed is stopped. Feed will also stop when a sheet of film becomes badly cocked in the feed rolls 44, 45.

Constantly meshing gears 76, 77 are secured to the left hand ends of feed rolls 44, 45, as viewed in FIGURE 9. When the slippable ring 71 drives the lower feed roll 45, the meshing gears cause the simultaneous rotation of the upper feed roll. When a sheet becomes badly cocked, two sheets of film attempt to pass through the space 48 simultaneously the slippable ring 71 is not able to drive the rolls and slipping occurs. Thus, when there is a condition which is apt to cause film damage, feed stops.

To facilitate the stripping of the top one of a stack of sheets of film, it is desirable to cause the tray 40 to vibrate. This invention has a novel arrangement for producing such vibration which includes a fractional horsepower electric motor 77 secured to the underside of the tray. An eccentric weight 78, FIGURES 3 and 4, is secured to output shaft 79 of the motor 77. The motor is caused to operate at least at times when the magnet 55 is energized to elevate the tray. Rotation of the output shaft 79 with the eccentric weight 78 on it causes vibration of the tray expediting and facilitating the stripping of sheets of film.

In FIGURE 1 a removable cover 80 is shown positioned over the removable feed assembly 15. The cover 80 includes a movable loading door 81 which is openable to permit loading of the elevator tray 40. When the cover door 81 is closed, a light tight encasing for the feed assembly 15 is provided so that lights in the darkroom may be turned on as the processor is operating.

Since the feed of the film is entirely automatic and enclosed within the light tight cover 80, it is desirable to provide the operator with a visual indication of whether or not the feed assembly is operating. As an examination of FIGURES 9 and 10 will show, a cam 82 is mounted adjacent the constant mesh upper feed roll drive gear 76. The cam 86 is equipped with a circumferentially spaced series of lobes which repetitively actuate a limit switch 83 as the feed rolls 44, 45 rotate. This limit switch 83 operates a flashing light to advise the operator as to whether or not the feed mechanism is operating. Thus, when the flashing of the light stops, the operator knows that there is a malfunction in the feeding mechanism.

(II) THE FILM TRANSPORT MECHANISMS 19

As is most plainly seen in FIGURE 11, the three film transport mechanisms 19, positioned in the developing, fixing, and wash tanks 16, 17, 18 are identical and interchangeable. Accordingly, a single one of these transport mechanisms will be described in detail with the principal description being directed to FIGURES 18 through 23.

The transport mechanism 19 includes a frame 90 which defines an inlet opening 91 for receiving a sheet of film indicated at 92. The sheet of film 92 is fed to the transport mechanism either from the feed assembly 15 or the preceding transport mechanism 19. The film is directed inwardly through the opening 91 until it strikes a deflector plate 93 which forms a part of the frame 90. The deflector 93 bends the film 92 downwardly through a space between a downwardly directing feed roll 94 and an intermediate feed roll 95. The mounting and drive of these rolls 94, 95, together with the mounting and drive of other of the rolls will be described presently.

The feed rolls 94 direct a sheet of film 92 downwardly along a feed path indicated by a line 96. This feed path 96 carries the film 92 between a spaced pair of transversely disposed spray bars 97 which direct processing fluid against the film. As an examination of FIGURE 19 will show, the feed rolls 94, 95 are parallel and positioned with their axes in a common horizontal plane immediately below the preferred fluid level. The spray bars 97 parallel these feed rolls and also have their axes in a common plane.

As the film 92 decends along the path 96 past the spray bars, it enters a chute defined by a fixed plate 98 and a pivotal plate 99. The film continues its downward descent until it enters a turnaround mechanism shown generally at 100. The turnaround mechanism includes a relatively large diameter main roll 101 journaled in the frame 90. The main turnaround roll 101 is surrounded by three spaced resiliently biased turnaround rolls 102 and a pair of curved deflector plates 103. The turnaround rolls 102 and the deflector plates 103 coact to cause the film 92 to adhere to the contour of the central turnaround roll 101 until the film is directed upwardly through a chute defined by another fixed plate 104 and another pivotally mounted plate 105.

The film 92 next passes between the intermediate feed roll 95 and a large diameter outlet feed roll 107 which is journaled in the frame 90. Film is then deflected outwardly, to the right as seen in FIGURE 19, by an outlet deflector plate 108 until it passes between the large diameter main outlet feed roll 107 and a small diameter outlet feed roll 109 positioned above the main roll. The film finally strikes a horizontally positioned exit deflector plate 110 and passes through an outlet opening 111 in the frame 90. The film passing through the outlet opening 111 will pass directly into the inlet opening 91 of the succeeding transfer mechanism or, in the case of the wash tank 18, directly into the dryer assembly 20. Thus, one feature of the mechanism is that film is transferred directly from one processing tank transfer mechanism 19 to the next eliminating the need for film transport mechanisms positioned between the removable processing transport mechanism.

The upstanding length of the two chutes, that is the distance between the upper feed rolls, at both inlet and outlet, and the turnaround mechanism is slightly less than the shortest film to be processed. Thus, in the case of X-ray film this space will be 6½″ with a minimum film dimension of 7″. This spacing, together with the use of deflector plates wherever possible, minimizes the number of times the film must pass between two rolls thereby providing maximum exposure to the processing fluids.

The frame 90 of the transfer mechanism 19 includes laterally projecting support members 112 at the top of the mechanism. As is seen in FIGURE 14, these support members 112 rest on the frame of the processor housing 10 to support a transport mechanism 19 in the appropriate one of the processing tanks. As seen in FIGURES 11 and 17, the members 112 and the frame have interlocking notches at 114 which locate the tanks.

As indicated in the introductory portion of this application, one of the oustanding features of the invention resides in the spray bars 97 which apply processing fluid directly to the surface of the film. This is accomplished in a manner which will be described in greater detail in the liquid distribution system portion of the specification. Other of the outstanding features of the invention reside in the construction which greatly expedites and facilitates cleaning and repair of the transport mechanism.

All rolls are constantly driven in a manner described below. Though they are constantly driven, all rolls other than the main turnaround roll 101 and the main outlet feed roll 107 float in defined paths and are yieldably biased toward the main rolls. Moreover, all rolls other than the main rolls are designed to be quickly removed from the transport mechanism 19 without the use of any tools of any type. The top outlet roll 109 is gravity biased into position and may be lifted out of its locating guide slots 113, FIGURE 18, whenever desired. The remaining small diameter rolls 94, 95, and 102 are all positioned in suitable guide slots and biased into position by pivotally supported spring retainers.

The support of the rolls 94, 95, is best seen in FIGURES 14 and 20. An examination of these will show that two rolls are slidably positioned in spaced guide slots 115. The guides slots 115 are open at their outer ends so that the rolls 94, 95, can be slid in and out of the slots 115. The rolls are identical and there is no particular order of insertion. Once the rolls are inserted they are maintained in place by a pair of pivoted spring retainers 116 one of which is carried at each end of the frame 90. The spring retainers 116 are mounted on suitable pivots 117, FIGURES 14 and 18. Normally the spring retainers are disposed in grooves 118 near the ends of the downward feed roll 94. Inward flexure of the spring retainers 116 permits them to pivot outwardly allowing the rolls to be removed. When positioned for roll retaining as shown in the FIGURES 14 and 20, the spring retainers 116 are maintained against pivoting by the side walls of the grooves 118 and at the same time they yieldably bias the roll 94 against the roll 95 and the roll 95 in turn against the main outlet roll 107.

The rolls 102 are each individually positioned in guide-slots 120, see FIGURES 18, 21, and 22. In FIGURE 22 the positioning of a spring retainer 121 corresponding to one of the spring retainers 116 is shown in solid lines. The phantom line position of the retainer 121 shows it disconnected to permit removal of the roll 102. As an examination of FIGURES 21 and 22 will show, there is a groove 123 near the end of the roll 102 with a spring retaining flange 124 provided at the end of the roll to keep the spring retainer 121 in its roll retaining position when the device is assembled. Thus, by simply flexing and pivoting the spring retainers 116, 121, it is possible, without any tools whatsoever, to permit removal of all of the small diameter rolls 94, 95, and 102.

Cleaning of the chutes is also accommodated by a novel construction. The pivotal plates 99 and 105 each pivot outwardly to permit the chute areas to be cleaned. In FIGURE 19 the plate 105 is shown in solid lines in its film processing position. The pivotal plate 105 is hingedly mounted at 125 so that it may be moved from its solid line position to the phantom position to facilitate cleaning.

The pivotal plates 105, 99 are located and maintained in their processing position by pairs of leaf spring latches 126, 128 respectively. The operation of one of the leaf spring latches 128 is shown best in FIGURE 23 where the solid line position shows a latching pin 127 carried by the latch 128 and locking the pivotal plate 99 in its film processing position. Movement of the leaf spring latch 128 from its solid line position to its phantom line position disengages the pin 127 from the frame 90 allowing the pivotal plate 99 to be moved outwardly to its cleaning position. The similar leaf spring latches 128 of the pivotally mounted plate 105 operate in a manner identical to the leaf spring latches 128.

As is seen in FIGURES 14 and 17, the transport mechanism 19 has an idler shaft 130 which is driven by the main drive shaft 23. The drive of the idler shaft 130 by the main shaft 23 is through a worm 131 fixed to the main shaft and a worm gear 132 secured to the outer or right hand end, as viewed in FIGURES 14 and 17, of the idler shaft 130. The idler shaft worm gear 132 is lifted out of engagement with the worm 131 whenever the transport mechanism 19 is lifted out of the processing tank. Thus, connection of the roller drive system, driven by the idler gear 130 in a manner which will be described in greater detail below, is through a removable connection of the worm 131 and the worm gear 132.

Rotation of the various feed rolls in the transport mechanism 19 is obtained through constantly meshing gearing. A feed roll drive gear 133 is secured to the idler shaft 130 and in constantly meshing engagement with an outlet main feed roll gear 134. Other of the gearing is best seen in FIGURE 18. An examination of that drawing will shown that a pinion 135 is fixed to the end of the top of the roll 109 and in engagement with the main feed roll gear 134. Similarly a pinion 136 on the intermediate feed roll 95 engages the gear 134 and drives a pinion 137 on the downward feed roll 94. Idler gears 138 transmit rotational force from the outlet main roll gear 134 to a turnaround main roll gear 139 secured to the main turnaround roll 101. Turnaround pinions 140 secured to the turnaround rolls 102 are driven by the main turnaround roll 139.

(III) THE TANKS AND LIQUID DISTRIBUTION SYSTEM

The features of the liquid distribution system will be understood best by reference to the schematic diagram shown in FIGURE 25. Reference to FIGURES 11 and 14 through 16 will also be helpful to correlate the schematic showing in FIGURE 25 with the structure shown in those figures.

As an analysis of the schematic diagram and the other drawings will show, the fluid distribution systems for the developing and fixing tanks are substantially identical. Accordingly, the distribution system of the fixing tank will be described. Comparable parts in the developing fluid distribution system will be designated by corresponding numbers with the letter "D" added to identify the developer system.

During normal operation the fixing tank 17 would preferably be filled manually to the desired level. During operation pumps 150 and 150D are turned on by closing an appropriate switch as will be described in greater detail in the electrical section. A venturi 151 is positioned between the base of the processing tank 17 and the pump 150 connecting them together. When the pump is operated, fluid is drawn from the base of the tank 151 through filter bypass passages 152, FIGURE 16, and through a main venturi inlet 153. Fluid drawn through the main venturi inlet 153 is first filtered by a filter 154. The filter 154 is a tubular insert that telescopes over the inlet end of the venturi and stands upright in the processing tank 16 extending substantially to the top of the tank and projecting close to the top of the fluid level. The by-pass passage 152 are provided to assure proper fluid supply to the venturi and to prevent the establishment of a back pressure as might occur with an old and clogged filter.

Fluid from the outlet end of the pump 150 is directed through an outlet conduit 156 into a cooling manifold 157. The cooling manifold 157 is a vertically disposed upstanding pipe with an outlet 158 near its top. A flexible conduit 159 removably connects the film transport mechanism spray bars 97 to the manifold outlet 158.

Replenishment fluid is drawn into the system by the venturi 151 through a replenishment supply line 160. The line 160 includes a visual flow meter 161 mounted on the control panel 25.

A manually actuated control valve 162 is connected into the replenishment line 160. Similarly, a replenishment feed control valve 163 is connected into the replenishment line 160. A solenoid 164 controls the replenishment valve 163 in a manner which will be described in detail in the electrical section so that replenishment fluid is fed to the venturi if, but only if, film is being transported through the mechanism.

As is shown in FIGURE 14, the processing tanks 16 and 17 are equipped with overflow lines 165 which conduct excess processing fluid to a drain.

As has been suggested previously, one of the outstanding features of the invention resides in the spray bars 97, which are positioned immediately below the levels of the over-flows 165 and, therefore, below the fluid level in the tanks. The outlet orifices of the spray bars are oriented to emit jets of fluid which impinge obliquely and downwardly directly on surfaces of the film being transported. Since the spray bar outlets are below the level of fluid in the tank 17, the emitted jets of fluid agitate the fluid in the tank around the film. Moreover, since the jets of fluid contain the fresh replenishment fluid, maximum benefit of the fresh fluid is obtained. This combined impingement and agitation action with fresh fluid so decreases the time which sheets of film must be maintained in the processing tanks that developing, fixing, and wash times may, for the first time, be identical. Further, since the spray bars are positioned immediately below the liquid level, the fast processing action commences as soon as the sheet of film enters the body of processing fluid.

Rinse water is fed directly to the rinse tank 18 by a rinse water supply conduit 170. Water from the rinse tank is removed through an overflow type drain 171 which has in inlet only at its top at a level of rinse water desired in the tank 18. The rinse water conduit 170 is controlled by a manually actuatable valve 172 and is supplied by a mixing valve 173. The mixing valve 173 has cold and hot water supply lines 174, 175, which feed water to it.

The rinse water supply conduit 170 passes axially through the processing fluid manifolds 157 and 157D, to cool the fluid in these manifolds. The conduit 170 and each of the manifolds 157, 157D together define tubular upstanding fluid cooling spaces surrounding the conduit. As an examination of the drawings will show, the inlet to the manifolds is near the bottom while the outlets are near the top so that when the device is in operation these tubular spaces in the manifolds will be substantially filled with processing fluids at all times. The rinse water passing through the conduit 170 will, then, cool substantial quantities of both developing and fixing fluid as it flows to the rinse tank 18.

(IV) ELECTRICAL CONTROLS AND SUMMARY

Referring now to FIGURE 24, conductors 180 and 181 connect the main drive motor 22 to a line L. A manually actuable main drive motor switch 182 is included in the conductor 181 and mounted on the control panel 25 of the processor, FIGURE 2. Closing of the main drive switch 182 energizes the motor 22.

The pumps 150 and 150D are connected to the line L by conductors 188 and 189 and controlled by a manually actuatable switch 190 also mounted on the control panel 25. Similarly, a dryer motor 191 and dryer heating elements 192 are connected across the line L1 by conductors 193 and 194. The dryer motor and elements 191, 192, are controlled by a manually actuatable switch 195 which is also on the main control panel.

The fourth switch on the main control panel 25 is a manually actuated single pole switch 197 which controls the automatic feed mechanism 15. The feed switch 197 is connected to one side of the line by a conductor 198. The other side of the switch is connected through a conductor 199 to a normally closed contact 200 of a relay 201. The contact 200 is in turn connected through conductor 202 to a single throw, double pole timer switch 203. The timer switch 203 is normally connected to a conductor 204 which connects the vibrator motor 77 to the other side of the line L. A rectifier 183 is connected in parallel with the motor 77 by conductors 184. Conductors 185 connect the magnet 55 to the output of the rectifier 183.

The feed roll actuated microswitches 61, 62 are connected in parallel through conductors 205, 206, to one side of the line L. Conductor 207 connects the other sides of the microswitches 61, 62 to coil 208 of the relay 201. A conductor 209 in turn connects the coil 208 to the other side of the line L.

Whenever either one of the microswitches 61, 62, is closed by the pressure of a sheet of film passing between the feed rolls, the coil 208 is energized opening the switch 200 and de-energizing the motor 77 and the magnet 55 to drop the tray 40. Similarly, closing either one of the microswitches 61, 62, energizes, through conductor 210, the solenoids 164 and 164D to open the replenishment fluid control valves 163, 163D.

A conductor 211 connects the cam controlled switch 83 in parallel with the roll controlled microswitches 61, 62 to cause lights 212 and 213 to flash whenever film feeding is in process. One of the lights, 212, 213, may be positioned within and the other without the darkroom.

Once a sheet of film has passed through the feed rolls 44, 45, the switches 61, 62 resume their open conditions, stopping the replenishment fluid feed and de-energizing the relay 201 so that the switch 200 of the relay returns to its normally closed position re-energizing the magnet 55 and the vibrator motor 77. This causes the tray 40 to elevate again. If there is no film left in the tray, of course, the microswitches 61, 62 will remain open. The timer will, after a predetermined period of time, such as 15 seconds, cause the throw 203 of the timer to de-energize the magnet 55, 77, and to connect the conductor 202 through conductor 215 to the other side of the line. When conductor 215 is energized, a buzzer 216 is energized issuing an audible signal to the operator that film has now been fed from the feed mechanism 15.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a film feeder and a processor of sheets of photographic film, said feeder comprising:
   (a) a film support means adapted to support a stack of sheets of film of varying sizes and to align a forward edge of each sheet of film with the forward edge of every other sheet in the stack;
   (b) stripping and feed means connected to the support means for stripping sheets of film from such stack one at a time and feeding such stripped sheets forward edge first to the film processor;
   (c) said stripping and feed means including a feed roll above the film support means and positioned to contact the top one of a stack of sheets on the film support means and stripper means positioned to block feeding movement of the remainder of the stack; and
   (e) drive means rotating the feed roll in a direction simultaneously to advance each stripped sheet of film toward the processor and to strip such sheet from the stack.

2. The device of claim 1 wherein the support means includes a pivotally mounted tray and the feed means includes a feed roll and yieldable means to pivot the tray toward the roll.

3. The device of claim 2 wherein the yieldable means includes a slip clutch.

4. The device of claim 3 wherein the slip clutch is magnetically energized.

5. The device of claim 1 wherein the feed means includes a pair of feed rolls and slippable drive means connected to one of the rolls and adapted to slip when a condition apt to result in injury to a sheet of film occurs.

6. The device of claim 1 wherein the stripping and feed means includes means to vibrate a stack of sheets of film.

7. The device of claim 1 wherein a vibration producing means is connected to the film support means for vibrating a stack of sheets of film thereon and aligning said one edge.

8. A film feeder for a processor of sheets of photographic film comprising:
   (a) an elevator adapted to support a stack of sheets of film;
   (b) actuation means connected to the elevator for selectively and repetitively raising the elevator;
   (c) stripping and feed means connected to the elevator and adapted to strip a single sheet of film from such stack each time the elevator is raised, and to feed such stripped sheet to a film processor;
   (d) said stripping and feed means including a feed roll above the elevator positioned to contact a top one of a stack of sheets of film when the elevator is raised and stripper means positioned to block feeding movement of the remainder of the stack while the top sheet is fed by the action of the feed roll between the feed roll and the stripper means;
   (e) drive means rotating the feed roll in a direction simultaneously to advance each stripped sheet of film toward the processor and to strip such sheet from the stack.

9. In the device of claim 8:
   (a) a vibration-producing electric motor connected to the elevator and having an output shaft;
   (b) an eccentric weight on the output shaft; and,
   (c) means to operate the vibration motor whenever the elevator is energized.

10. The device of claim 8 wherein a signal-producing means is connected to the film feeder and adapted to stop the feed and to emit a warning signal whenever two sheets of film are stripped from the stack by the feed roll.

11. A film feeder for a processor of sheets of photographic film comprising:
   (a) an elevator adapted to support a stack of sheets of film;
   (b) actuation means connected to the elevator for selectively and repetitively raising the elevator;
   (c) stripping and feed means connected to the elevator and adapted to strip a single sheet of film from such stack each time the elevator is raised, and to feed such stripped sheet to a film processor;
(d) said stripping and feed means including a feed roll above the elevator positioned to contact a top one of a stack of sheets of film when the elevator is raised and stripper means positioned to block feeding movement of the remainder of the stack while the top sheet is fed between the feed roll and the stripper means; and,
(e) a signal means connected to the feeder and adapted to emit a signal whenever the tray has been emptied of sheets of film.

12. The device of claim 11 wherein said film support means comprises a pivotally supported tray, and a linkage system for elevating said tray selectively and wherein said linkage system includes a yieldable means for biasing said stack of film against said one roll.

13. The device of claim 12 wherein said yieldable means is a spring.

14. The device of claim 12 wherein an electromagnetic clutch is utilized to energize said linkage system.

15. A film processor comprising:
(a) a frame supporting developing, fixing, and wash tanks;
(b) transport means supported by the frame for transporting sheets of photographic film through said tanks;
(c) film supply means for automatically stripping sheets of film from a stack of sheets of a plurality of lengths and feeding such stripped sheets to the transport means one at a time; and
(d) said supply means including time delay means causing a predetermined time interval to elapse between the conclusion of the feeding of one sheet and the commencement of the feed of the succeeding sheet irrespective of the length of the first of the two sheets whereby to space the sheets from one another uniform distances as they are fed to the transport means.

16. The device of claim 15 wherein the time delay means is responsive to the length of each sheet whereby the spacing between the sheets is uniform.

17. The device of claim 16 wherein the time delay means produces uniform spacing irrespective of the length of the sheets.

18. The device of claim 15 wherein the film supply means comprises:
(a) a film support means adapted to support a stack of sheets of film;
(b) stripping and feed means connected to the support means for stripping sheets of film from such stack one at a time and feeding such stripped sheets to a film processor; and
(c) said stripping and feed means including a feed roll above the film support means and positioned to contact the top one of a stack of sheets on the film support means and stripper means positioned to block feeding movement of the remainder of the stack.

19. A film processor comprising:
(a) a frame supporting a film processing tank;
(b) transport means supported by the frame for transporting sheets of photographic film through said tank;
(c) film supply means for automatically stripping sheets of film from a stack and feeding such stripped sheets to the transport means one at a time; and,
(d) said supply means comprising:
(i) upper and lower feed rolls;
(ii) a pivoted tray for supporting a stack of sheets of film and moving the top sheet of a stack into abutment with the top feed roll;
(iii) a stop and stripper plate positioned near the feed roll to define a stripping opening and positioned to abut a stack of film on the tray; and,
(iv) an elevating mechanism for sequentially and repetitively elevating the tray.

20. The device of claim 19 wherein the lower feed roll is yieldably mounted and wherein a limit switch is actuated by movement of the lower roll caused by the pressure of a sheet of film between the feed rolls; and wherein the limit switch controls the elevating mechanism.

21. The device of claim 20 wherein the film processor includes a fluid replenishment system having a flow control valve, a circuit means is provided to energize the flow control valve, and said circuit means is connected to said limit switch whereby actuation of the limit switch controls the elevating means and the flow control valve thereby to control the flow of replenishment fluid.

22. In a film processor having developing, fixing, and washing tanks, a fluid distribution system comprising:
(a) a first circulating conduit system having an inlet connected to the bottom of the developing tank and an outlet positioned near the top of the developing tank;
(b) a second circulating conduit system having an inlet connected to the bottom of the fixing tank and an outlet positioned near the top of the fixing tank;
(c) a plurality of upstanding, elongated, tubular filters, one of such filters in each of said tanks;
(d) each of said systems including a plurality of inlets in each tank with at least one communicating with the interior of the filter in that tank and another by-passing the filter;
(e) said system including a plurality of upstanding fittings each around one of the filter-communicating inlets; and,
(f) each of said filters being telescoped over one such fitting.

23. In a film processor having developing, fixing, and washing tanks and a pair of feed rolls, the improvement comprising:
(a) a fluid distribution system;
(i) a first circulating conduit system having an inlet connected to the bottom of the developing tank and an outlet positioned near the top of the developing tank;
(ii) a second circulating conduit system having an inlet connected to the bottom of the fixing tank and an outlet positioned near the top of the fixing tank;
(iii) each of said systems including a replenishment supply line and a normally-closed solenoid-actuated valve in each such line; and,
(iv) a film feed sensing circuit connected to and controlling the solenoid valves for opening the valves whenever a sheet of film is fed into the processor and including means for sensing the length of a sheet of film being fed and for maintaining said valves in an open condition for a time period proportional to the length of the sensed sheet of film being fed into the processor;
(b) a mechanism feeding film to the rolls comprising;
(i) a film support means adapted to support a stack of sheets of film; and,
(ii) stripping and feed means connected to the support means for stripping sheets of film from such stack one at a time and feeding such stripped sheets to the rolls; and,
(c) said film feed sensing circuit being connected to the pair of film feed rolls and responsive to film being fed through the rolls.

24. In a film processor having developing, fixing, and washing tanks and a pair of feed rolls, the improvement comprising:
(a) a fluid distribution system comprising:
(i) a first circulating conduit system having an inlet connected to the bottom of the developing tank and an outlet positioned near the top of the developing tank;
(ii) a second circulating conduit system having an inlet connected to the bottom of the fixing tank and an outlet positioned near the top of the fixing tank;
(iii) each of said systems including a replenishment supply line and a normally-closed solenoid-actuated valve in each such line; and,
(iv) a film feed sensing circuit connected to and controlling the solenoid valves for opening the valves whenever a sheet of film is fed into the processor and including means for sensing the length of a sheet of film being fed and for maintaining said valves in an open condition for a time period proportional to the length of the sensed sheet of film being fed into the processor;
(b) said rolls being a spaced pair of feed rolls mounted on the frame adjacent to a film feed mechanism and positioned to transport sheets of film supplied by said film feed mechanism;
(c) said film feed sensing circuit being responsive to movement of said feed rolls; and,
(d) said film feed mechanism comprising;
  (i) a frame;
  (ii) a tray pivotally mounted on the frame for pivoting about a horizontal axis and sloping downwardly towards a discharge end; and,
  (iii) slippable elevating means connected to the tray and adapted to elevate the discharge end until the top sheet of a stack of sheets of film on the tray abuts one of the feed rolls.

25. A film feeder for a processor of sheets of photographic film comprising:
(a) an elevator adapted to support a stack of sheets of film;
(b) vibration producing means connected to the elevator and adapted to vibrate the elevator whenever the elevator is energized;
(c) actuation means connected to the elevator for selectively and repetitively energizing the elevator by raising it;
(d) said vibration producing means comprising an electric motor connected to the elevator and having an output shaft, an eccentric weight on the output shaft, and means to operate the vibration motor whenever the elevator is energized; and,
(e) stripping and feed means connected to the elevator and adapted to strip a single sheet of film from such stack each time the elevator is raised and to feed such stripped sheet to a film processor.

26. In combination, a film processor and a film feeder:
(a) the film processor including a plurality of tanks for containing processing fluids, a film transport mechanism in each said tank, and the improvement which comprises:
  (i) fluid supply means for maintaining the level of fluid in each of said tanks at a predetermined level;
  (ii) fluid replenishment and agitation members positioned in certain of said tanks below said predetermined level;
  (iii) said transport mechanism establishing a path of film travel through its tank;
  (iv) said replenishment members being positioned on opposite sides of and adjacent said path of travel and positioned to emit fluid tangentially toward said path generally in the direction of film travel whereby to create conditions of turbulence on opposite sides of said path and agitating the fluid; and,
  (v) said supply means being connected to said tanks for recirculation and to a supply of replenishment fluid and also connected to said replenishment members whereby to direct fresh replenishment fluid against the film as it is added to the fluid in the tank thereby applying fresh replenishment fluid against the film to reduce processing time;
(b) said processor also including:
  (i) a film feed sensing mechanism connected to said film feeder and responsive to the feeding of a sheet of film into said processor; and,
  (ii) said film feed sensing mechanism being connected to said fluid replenishment means to actuate the fluid replenishment means each time a sheet of film is being fed into said processor and to maintain replenishment throughout said film feed whereby to provide a quantity of fresh processing fluid proportional to the size of the sheet of film being processed, as the film is being fed into the processor.

27. A film processor comprising:
(a) a frame;
(b) developing, fixing, and wash tanks supported on said frame;
(c) three removable film transport mechanisms, one of said mechanisms being positioned in each tank;
(d) a sheet film feed means mounted on the frame and adapted to feed sheets of film one at a time from a stack of sheets to the transport mechanism in the developing tank;
(e) fluid circulating systems connected to the developing and fixing tanks for circulating processing fluids from the bottom to the top of the tanks, each such system including a replenishment line; and,
(f) an electric circuit for controlling the operation of said processor and including sensing means responsive to the feeding of film by said feed means to control said feed means and the flow of fluid through the replenishment line for a time period proportional to the length of the sheet of film being fed, irrespective of the length of said film.

28. The device of claim 27 wherein the feed means includes a pair of feed rolls and the sensing means is a limit switch responsive to the presence of a sheet of film between the feed rolls.

29. The device of claim 27 wherein said sheet film feed means comprises:
(a) a film support means adapted to support a stack of sheets of film; and,
(b) stripping and feed means connected to the support means for stripping sheets of film from such stack one at a time and feeding such stripped sheets to a film processor.

30. A film processor including a frame and a pair of feed rolls journaled on the frame the improvement which comprises:
(a) a cam fixed to one of the feed rolls for rotation therewith, the cam including at least one radially extending lobe;
(b) a limit switch mounted on the frame and positioned for actuation by said lobe; and,
(c) an electric circuit including a light connected to said limit switch, said light being controlled by limit switch whereby when the roll is rotating the cam will actuate the limit switch and cause the light to flash.

31. A film processor including a frame and a pair of feed rolls journaled on the frame and rotatable to feed sheets of film into the processor one at a time, the improvement which comprises:
(a) signal control means interposed between one of the rolls and the frame for sensing rotation of said one roll; and,
(b) an electric circuit including a signal emitting member connected to said signal control means, said member being controlled by said means such that the member will issue operator discernible signals indicating interruption of film feed.

32. In a film processor including an automatic feed assembly for sequentially feeding sheets of film from a stack one at a time, the improvement which comprises:
(a) a feed control circuit including a normally closed solenoid actuated switch;

(b) said assembly including a feed initiating mechanism connected to and controlled by said switch; and, (c) said circuit including film feed sensing means responsive to the feed of a sheet of film for selectively energizing a solenoid to open said normally closed switch whenever a sheet of film is being fed.

33. The device of claim 32 wherein a timer controlled switch is series connected with the normally closed switch to break said feed control circuit whenever said normally closed switch remains closed for a predetermined period of time.

34. The device of claim 33 wherein said timer controlled switch energizes a signal emitting means whenever said predetermined period of time elapses.

35. A film feed device for use with a film processor comprising:
(a) a housing;
(b) a film feed assembly including support members;
(c) said housing including supporting members removably supporting the film feed assembly;
(d) said support and supporting members including pin and notch means supporting the assembly in a desired position while permitting lift out removal of the assembly; and
(e) said assembly including:
  (i) a film support means adapted to support a stack of sheets of film; and,
  (ii) stripping and feed means connected to the support means for stripping sheets of film from such stack one at a time and feeding such stripped sheets to a film processor.

36. An automatic feed assembly for sequentially feeding sheets of film from a stack one at a time to a film processor of the like comprising:
(a) a feed control circuit including a normally closed solenoid actuated switch;
(b) said assembly including a feed initiating mechanism connected to and controlled by said switch; and
(c) said circuit including film feed sensing means responsive to the feed of a sheet of film for selectively energizing a solenoid to open said normally closed switch whenever a sheet of film is being fed.

37. A film feeder for stripping and feeding sheets one at a time from a stack of sheets comprising:
(a) a pair of feed rolls positioned substantially in abutment with one another and to rotate about axes lying in a common plane;
(b) said feed rolls establishing a path of sheet travel normal to said plane;
(c) a film supply means positioned to support a stack of sheets of material with the sheets each disposed at an angle inclined with respect to said plane;
(d) said sheet support means including means to bias the top one of a stack of sheets of film into engagement with one of said feed rolls; and,
(e) a stripper plate positioned between said stack and the other of said feed rolls and spaced from said one feed roll a distance greater than the thickness of the number of said sheets to be fed, but less than the thickness of a number of sheets in excess of the number to be fed.

38. The device of claim 37 wherein said one roll is of greater diameter than said other roll.

39. The feeder of claim 37 wherein the feed rolls of the pair rotate in opposite directions.

40. A film sheet feeder for sequentially supplying exposed film sheets in an edgewise fashion to a film processor comprising:
(a) a sloping tray for holding a stack of sheets;
(b) a feed roller located over the lower end of said tray;
(c) a tray drive means operable to periodically raise the lower end of the tray so that a top sheet of the stack is engaged by said roller to be driven thereby to the processor input;
(d) a stripper bar positioned to engage the lower end surface of each of the sheets of the stack and being spaced from said roller a distance allowing passage of only one film sheet;
(e) an electrical device coupled to said drive means for selectively actuating said drive means to raise and lower said tray;
(f) first switch means responsive to the feeding of a sheet by said roller to de-energize said electrical device only when a sheet is not being fed by said roller; and,
(g) other switch means coupled in parallel with said first switch means and responsive to the position of the tray to energize said electrical device and raise said tray when no film is being fed by said feed roll and to de-energize said electrical device and lower the tray when film is being fed by said feed roll, whereby said tray stops in a lowered position during a feeding operation.

41. In a film processor including an automatic feed assembly for sequentially stripping sheets of film from a stack one at a time and then feeding such sheets to the processor, the improvement which comprises:
(a) a film feeding mechanism forming part of said assembly and adapted when energized to strip and feed sheets of film one at a time from said stack to said film processor;
(b) a mechanism energizing means connected to said film feed mechanism and forming part of said assembly, said energizing means being to actuate said film feed mechanism and cause said stripping and feeding of sheets of film one at a time to said processor; and,
(c) said energizing means including a disabling means operative to sense a sheet of film as it is being fed into the processor to disable the stripping irrespective of the length of said sheet of film being fed until the trailing edge of such sheet being fed has reached a predetermined position and thereafter enabling the stripping and feeding of a subsequent sheet of film in spaced relationship with said trailing edge.

References Cited
UNITED STATES PATENTS

| | | | |
|---|---|---|---|
| 2,837,988 | 6/1958 | Pavelle | 95—89 |
| 2,920,548 | 1/1960 | Copenhefer | 95—89 |
| 3,072,310 | 1/1963 | Kunz | 226—188 |
| 3,139,904 | 7/1964 | Wengel | 137—563 |
| 3,149,551 | 9/1964 | Cramer | 95—94 |
| 3,153,535 | 10/1964 | Gericke | 271—62 |
| 1,140,883 | 5/1915 | Dick | 271—53 |
| 1,832,278 | 11/1931 | Caps et al. | 95—94 |
| 2,286,351 | 6/1942 | Drucker | 95—97 |
| 2,665,906 | 1/1954 | Johnson | 271—36 |
| 2,670,954 | 3/1954 | Bach | 271—57 |
| 2,829,576 | 4/1958 | Debrie | 95—96 |
| 2,837,988 | 6/1958 | Pavelle | 95—89 |
| 2,883,191 | 4/1959 | Peugnet | 271—89 |
| 2,912,915 | 11/1959 | Hiserman | 95—97 |
| 2,927,503 | 3/1960 | Zollinger | 95—94 XR |
| 3,146,798 | 9/1964 | Chenault | 138—44 |
| 3,192,845 | 7/1965 | Schmidt | 95—94 XR |

FOREIGN PATENTS 818  8/1959  Great Britain.

NORTON ANSHER, *Primary Examiner.*

F. L. BRAUN, *Assistant Examiner.*

U.S. Cl. X.R.

271—39, 62